Patented Dec. 26, 1933

1,941,097

UNITED STATES PATENT OFFICE 1,941,097

PRODUCTION OF STEROLS

Robert F. Light, Mount Vernon, and Charles N. Frey, New York, N. Y., assignors to Standard Brands Incorporated, Dover, Del., a corporation of Delaware No Drawing. Application March 3, 1930
Serial No. 432,980

4 Claims. (Cl. 260—156)

This invention relates to processes of extracting sterols from yeast and other plant and animal products and more particularly to processes of extracting sterols, particularly ergosterol, from yeast, and especially from compressed yeast.

A general object of the invention is to provide a process of extracting and recovering such substances in a convenient, efficient and economical manner, in a relatively pure form, and with the attainment of high yields.

A more particular object of the invention is to provide a process by which such substances can be separated and recovered by a novel use of a water solution of a saponifying agent in combination with a solvent for the substances which is immiscible with the said water solution.

Other objects of the invention will in part be obvious and will in part appear hereinafter.

The invention accordingly comprises the several steps and the relation and order of one or more of such steps with respect to each of the others thereof, which will be exemplified in the process hereinafter disclosed, and the scope of the application of which will be indicated in the claims.

The sterols comprise a group of fatty substances which are characterized by the fact that they are unsaponifiable, and previous methods of extracting these substances have utilized first either a direct extraction with ether or some other suitable solvent, followed by saponification or a saponifying step and then one or more separate extraction steps, whereby unsaponifiable constituents are separated from the saponified mass.

In accordance with the principles of the present invention, the sterol containing material, such as, for example, compressed yeast. is cooked under pressure with an aqueous solution of a compound having an alkaline reaction such as for example a hydroxide or carbonate soluble in water, until the hydrolysis of the saponifiable constituents is sufficiently effected and the unsaponifiable constituents comprising the sterols, and particularly ergosterol are released. The mixture is then cooled and a small amount of a solvent for sterols which is immiscible with the solution is added, whereupon the mixture is refluxed with stirring until the sterols have gone into solution in the said solvent, and the solvent containing the sterols in solution is removed and the sterols are purified in any suitable manner.

Although the materials, pressures, and times of treatment may be varied, as will be readily understood by one skilled in the art, a preferred method of carrying out the process is as follows:

To 2 kilograms of compressed yeast, about 2 liters of water containing about 15% of sodium hydroxide is added. The mixture is then cooked under 20 lbs. pressure while stirring for about 5 hours to obtain a good liberation of the ergosterol and substantially a destruction of the cellular material, thereupon the solution is allowed to cool. About ½ liter of benzol is then added and the mixture is refluxed with constant stirring for about 10 minutes, during which time the benzol takes up the liberated ergosterol. Then, the benzol is allowed to separate out in a layer and is drawn off; the benzol is removed by evaporation and the oily residue is purified by taking up in alcohol, filtering, crystallizing out the ergosterol, washing with hot water to remove the soap and recrystallizing from alcohol until a product of the desired purity is obtained.

Generally speaking, the caustic alkali may be used in concentrations of from 6% to 15% in solution, potassium hydroxide may be substituted for the sodium compound and the alkali carbonates may be likewise used in concentrations of from 8% to 20%. Moreover, the pressure used may range from 20 to 30 lbs. and other substances relatively immiscible with water such as toluol, ethylene dichloride, petroleum ether or chloroform may be used instead of benzol, if desired, in amounts of from ½ to ¾ liters. By such procedure, yields of approximately 1 gram of ergosterol have been obtained per kilogram of yeast.

It will thus be seen that there has been provided a process which can be conveniently and expeditiously carried out to give a high yield of product, and since certain changes may be made in carrying out the above process without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent, is:

1. A process of obtaining sterols from crude substances containing the same which comprises saponifying the substances by cooking under about 20 lbs. pressure with a water solution of an alkaline material until the sterols are liberated, cooling the mixture, adding a solvent for sterols which is sufficiently immiscible with water to layer off readily, simultaneously heating and stirring until the sterols are dissolved therein, separating the solvent from the aqueous alkaline solution, and evaporating the solvent to obtain the sterols as a residue.

2. A process of obtaining sterols from compressed yeast which comprises saponifying the yeast by cooking under about 20 lbs. pressure with a water solution of caustic alkali until the sterols are liberated, cooling the mixture, adding benzol, simultaneously refluxing and stirring until the sterols are dissolved therein, separating the solvent from the aqueous alkaline solution, and evaporating the solvent to obtain the sterols as a residue.

3. A process of obtaining sterols from compressed yeast which comprises saponifying the yeast by cooking under about 20 lbs. pressure with a water solution of caustic alkali until the sterols are liberated, cooling the mixture, adding benzol, simultaneously refluxing and stirring until the sterols are dissolved therein, then separating the solvent from the aqueous alkaline solution while hot, and evaporating the solvent to obtain the sterols as a residue; for each 2 kilograms of yeast the materials used being substantially in the following proportions: water 2 liters, caustic alkali from 120 to 300 grams, benzol about ½ liter.

4. A process of obtaining sterols from crude substances containing the same which comprises saponifying the substances by cooking under pressure in the presence of water and an alkaline material until the sterols are liberated, cooling the mixture, adding a solvent for sterols which is sufficiently immiscible with water to layer off readily, simultaneously heating and stirring until the sterols are dissolved therein, then separating the solvent from the alkaline solution while hot, evaporating the solvent to obtain the sterols as a residue, taking up the residue in alcohol, filtering, crystallizing out ergosterol, washing the crystals with hot water to remove the soap, and recrystallizing from alcohol to obtain a pure product.

ROBERT F. LIGHT.
CHARLES N. FREY.